A. J. MOWRY & H. CHANCE.
Weed-Turner.
No. 163,881.  Patented June 1, 1875.
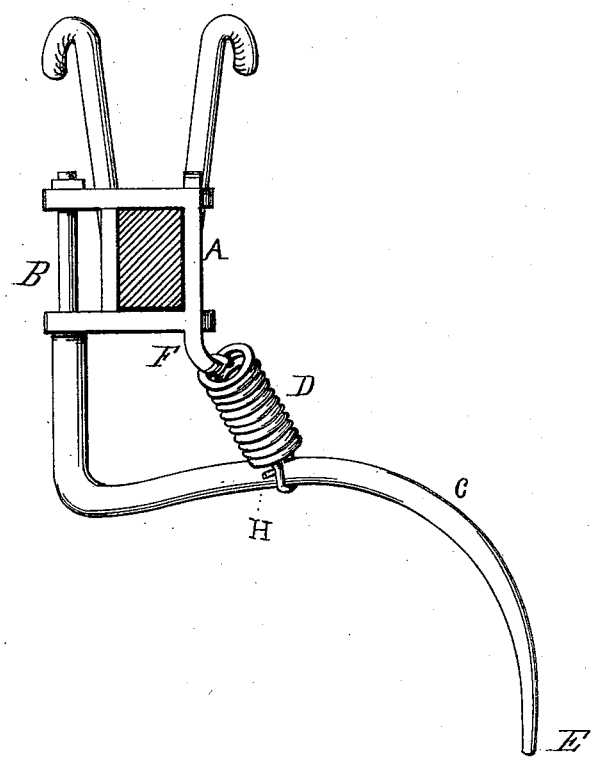

UNITED STATES PATENT OFFICE.

AARON J. MOWRY AND HENRY CHANCE, OF BURGOON, OHIO.

IMPROVEMENT IN WEED-TURNERS.

Specification forming part of Letters Patent No. 163,881, dated June 1, 1875; application filed April 15, 1875.

*To all whom it may concern:*

Be it known that we, AARON J. MOWRY and HENRY CHANCE, of the village of Burgoon, county of Sandusky and State of Ohio, have invented a Weed-Turner, of which the following is a specification:

The invention relates to a device for turning down weeds, grass, and similar material before the share of a plow, and holding them in a depressed position until the furrow is turned over them.

The accompanying drawing represents a front view of a device embodying the elements of the invention, and showing the plow-beam in the clevis, and the plow-handles to the rear.

The device consists of a frame or clevis, A, which is bolted or otherwise firmly secured upon the beam, and provided with the arm F, which extends below the clevis, and is provided at its lower end with the coiled spring D, the lower end of which is secured upon the turner or hook C, so that the spring can slip down the hook, but operates when drawn up, the same coming in contact with the pin H. The hook C is of the shape shown, and is placed so as to stand in front and to one side of the mold-board, leaving a space sufficient for the furrow between the hook and board. The upper end of the hook is reduced to the swivel B, which operates in the framing of the clevis, being secured therein by a nut or in other suitable manner.

The point E of the hook C, in operation, passes along the bottom of the furrow, thereby holding down the herbage until the furrow is thrown upon it. The spring D allows the hook to move backward whenever the hook comes in contact with any unyielding obstruction, or when the plow is thrown over upon the mold-board side, the spring being made sufficiently strong to overcome the resistance of ordinary herbage. The device may readily be adapted to a right or left hand plow.

What we claim as our invention, and desire to secure by Letters Patent, is—

The clevis A, in combination with the hook C, of the shape shown, operating upon the swivel B, and attached to the clevis by the coiled spring D, substantially as shown and described.

AARON J. MOWRY.
HENRY CHANCE.

Witnesses:
J. V. JONES,
JOHN W. BRADNER.